(12) United States Patent
Cifaldi (10) Patent No.: US 6,372,978 B1
(45) Date of Patent: Apr. 16, 2002

(54) WIND/SUN SOLAR COLLECTION SYSTEM (HS2)

(76) Inventor: Carmine Cifaldi, 45 Woodland Dr., West Paterson, NJ (US) 07424

( * ) Notice: Subject to any disclaimer, the term of this patent is extended or adjusted under 35 U.S.C. 154(b) by 0 days.

(21) Appl. No.: 09/740,950

(22) Filed: Dec. 21, 2000

(51) Int. Cl.$^7$ ............................................. H01L 31/058
(52) U.S. Cl. ...................... 136/248; 136/244; 136/246; 136/205; 136/206; 136/202; 136/291; 126/655; 126/649; 126/629; 126/631; 126/663; 126/637; 126/634
(58) Field of Search ................................. 136/244, 248, 136/246, 205, 206, 202, 291; 126/655, 649, 663, 637, 629, 631, 634

(56) References Cited

U.S. PATENT DOCUMENTS

| | | | |
|---|---|---|---|
| 3,985,116 A | * | 10/1976 | Kapany ..................... 126/687 |
| 4,098,263 A | | 7/1978 | Lanciault |
| 4,119,863 A | | 10/1978 | Kelly |
| 4,210,129 A | * | 7/1980 | O'Hanlon ................... 126/661 |
| 4,246,888 A | * | 1/1981 | Jarzenbeck, Sr. ........... 126/620 |
| 4,249,083 A | | 2/1981 | Bitterly |
| 4,289,117 A | | 9/1981 | Butcher |
| 4,333,448 A | | 6/1982 | Johnson |
| 4,409,961 A | | 10/1983 | O'Hare |
| 4,421,943 A | | 12/1983 | Withjack |
| 4,526,162 A | | 7/1985 | Arai |
| 4,551,631 A | | 11/1985 | Trigilio |
| 4,742,291 A | | 5/1988 | Bobier et al. |
| 4,779,006 A | | 10/1988 | Wortham |
| 4,797,566 A | | 1/1989 | Nozaki et al. |
| 4,841,731 A | | 6/1989 | Tindell |
| 4,884,953 A | | 12/1989 | Golben |
| 5,075,564 A | | 12/1991 | Hickey |
| 5,163,821 A | | 11/1992 | Kelly et al. |
| 5,275,150 A | | 1/1994 | Lai |
| 5,394,016 A | | 2/1995 | Hickey |
| 5,512,787 A | | 4/1996 | Dederick |
| 5,694,774 A | | 12/1997 | Drucker |

* cited by examiner

*Primary Examiner*—Alan Diamond
(74) *Attorney, Agent, or Firm*—Siemens Patent Service, LC (57) ABSTRACT

The present invention is a self-contained, solar powered heating and cooling system for a building. The collector has an insulated heating chamber, and a light transmissive cover and a thermostatically controlled vent. The chamber contains absorptive columns standing on the floor. An internal liquid conduit exposes the liquid to the heat within the chamber. The collector is connected to a remote thermal reservoir such that a liquid circuit and a separate gas circuit both circulate heated fluid to the reservoir. Heat can be stored in any of a liquid reservoir, thermal mass reservoir and gas reservoir. Wind powered generators and photovoltaic cells provide power for the system or other applications. The thermal reservoir has heat exchangers which deliver stored heat to the building or operate a heat operated refrigeration machine (e.g., a liquid absorption chiller). Additional self sustaining power sources may optionally be incorporated into the present invention.

43 Claims, 3 Drawing Sheets

WIND/SUN SOLAR COLLECTION SYSTEM (HS2)

BACKGROUND OF THE INVENTION

1. Field of the Invention

The present invention relates to collection systems for self sustaining energy sources. More particularly, the invention comprises a solar thermal collector which heats both gas and liquid in separate circuits and also provides wind and photovoltaic electrical generation. The collector is associated with a thermal reservoir for storing thermal energy. The generator can power a fan and a pump for thermal collection, and optionally augment heat stored in the reservoir with resistive elements powered by the generator. A number of additional self sustaining energy generation systems could easily be adapted to complement solar and wind sources, as well.

2. Description of the Prior Art

It is desirable to exploit solar energy for heating, ventilating, and air conditioning for economic, practical, and environmental reasons. Systems employing solar power incur neither economic nor environmental fuel costs. In some applications, other sources of power are not readily available. In such applications, a self contained heating, ventilating, and air conditioning system would be both feasible and practical for providing heating, ventilating, and air conditioning services to a building. For example, a house or other building located remotely from readily available electric utility power could be heated, cooled and supplied with electricity by a self contained system.

Solar energy may be collected by photovoltaic cells which convert solar energy directly into electrical power. Alternatively, energy may be collected by photothermal collectors which convert solar energy directly into heat. Electricity is quite versatile in that it can be readily converted into either heat or made to generate mechanical energy for driving diverse machines. However, at the current state of the art, efficiency of thermal collectors greatly exceeds that of photovoltaic cells. Therefore, ideally a self contained heating and cooling system is reliant upon photothermal conversion for maximal energy capture and also upon photovoltaic conversion to power ancillary functions necessary to operate fluid heat transfer systems.

The prior art presents many attempts made over a long period of time to harness the sun. U.S. Pat. No. 4,098,263, issued to Joseph A. Lanciault on Jul. 4, 1978; U.S. Pat. No. 4,289,117, issued to Harry L. Butcher on Sep. 15, 1981; U.S. Pat. No. 4,333,448, issued to Steven A. Johnson on Jun. 8, 1982; and U.S. Pat. No. 4,526,162, issued to Nobushige Arai on Jul. 2, 1985, describe solar heat collectors, each comprising an enclosure having a cover closing a heating chamber and a fluid conduit disposed within the chamber for recovering entrapped heat. The devices of Lanciault, Johnson and Arai lack the light intercepting structure found in the novel photothermal collector, do not heat both liquid and gas separately and simultaneously, as in the present invention, and lack the supplementary wind and photovoltaic generating capability of the present invention.

U.S. Pat. No. 5,275,150, issued to Herman Lai on Jan. 4, 1994, presents a photothermal solar collector which provides a reflective bottom configured to reflect light against tubes containing a liquid being heated. These surfaces and tubes are parallel to the top transparent panel of the collector, rather than being perpendicular thereto, in the manner of the present invention. Lai further does not heat both gas and liquid, as does the present invention. Additionally, the solar collector of Lai lacks supplementary wind and photovoltaic generating capabilities, as seen in the present invention.

U.S. Pat. No. 4,551,631, issued to Gaetano T. Trigilion on Nov. 5, 1985; U.S. Pat. No. 5,075,564, issued to John J. Hickey on Dec. 24, 1991; and U.S. Pat. No. 5,394,016, also issued to Hickey on Feb. 28, 1995, describe combined wind and photovoltaic generators. These generators, however, lack photothermal collections capabilities found in the present invention.

U.S. Pat. No. 4,421,943, issued to Eric M. Withjack on Dec. 20, 1983, describes a photovoltaic element mounted on a portable base. Withjack lacks photothermal collection capabilities, wind generating capabilities and thermal storage capabilities, as found in the present invention.

None of the above inventions and patents, taken either singly or in combination, is seen to describe the instant invention as claimed.

SUMMARY OF THE INVENTION

The present invention provides a highly efficient photothermal solar collector which converts light rays to heat by intercepting these rays and converting them to heat prior to escape of the energy by reflection. The collector includes separate fluid paths for heating both a liquid medium, such as water or glycol alcohol, and a gaseous medium, such as air. The novel collector has a heating chamber having insulated walls and floor, and an insulated, light transmissive cover exposed to sunlight. The chamber contains hollow, open topped, metallic cylinders disposed between the floor of the chamber and proximate the cover. These cylinders are of a dark color for intercepting light rays and absorbing the heat contained therein prior to loss by reflection. A liquid conduit is likewise disposed in the heating chamber so as to also absorb heat entrapped within the chamber.

The solar collector also has a wind turbine and photovoltaic panels to provide additional energy in the form of electricity. The electrical energy may be employed to operate controls and fluid motive apparatus such as a pump or fan. If not consumed in moving heated fluids or for the operations of controls, generated electrical energy may be contributed to stored heat energy through resistive elements, or may be stored in batteries. Electrical energy, in excess of the needs of the system, may be directed from the system to commercial powers mains. A backup carbon fueled electricity generator may also be automatically actuated to power needed operations energy and battery charging capability whenever utility supplied electricity is interrupted, not present, or when power generated by the photovoltaic cells and/or wind powered generator is insufficient to maintain system operation.

To this end, the collector is connected to a remote thermal reservoir providing liquid storage capability. Heat can thus be stored for subsequent retrieval when the supply thereof exceeds demand. Heated air from the collector can be directed to the thermal reservoir to retain heat not captured by the liquid media. A suitable heat exchange system supplies heat from the reservoir to building space in the winter.

In the cooling season, the solar collector contributes to cooling by supplying heat to operate a heat-based cooling system, such as a system including a liquid absorption chiller. Therefore, a relatively uncomplicated, inexpensive device of significant efficiency contributes to both heating and cooling inhabited space.

In addition to solar and wind energy, the system can be readily adapted to capture energy from a variety of additional self sustaining sources.

Accordingly, it is a principal object of the invention provide a high efficiency photothermal solar collector.

It is another object of the invention to proved within the heating chamber apparatus disposed to intercept light and convert the same to heat prior to loss of energy by reflection from within the chamber.

It is a further object of the invention to enable both heating and cooling from a single solar energy source.

Still another object of the invention is to provide both heat and electrical power so that the heating and cooling system can deliver and remove heat from a building without relying on external power.

An additional object of the invention is to heat both a liquid medium and a gaseous medium simultaneously.

It is again an object of the invention to provide electrical energy in both the presence and absence of daylight.

Yet another object of the invention is to store thermal energy when the supply exceeds the demand.

Still another object of the invention is to be automatically controlled by a programmer or computer responsive to remote override adjustments.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Traditionally, solar energy is collected and used almost simultaneously, with little or no storage except for domestic hot water. However, while the optimal season for collection is summer, the highest demand for energy is for heating in winter. To this point there has been no efficient method for storing solar gain for future use.

The present invention offers a solar collection, storage and distribution system which is operative 365 days out of the year, in the collection and/or distribution mode. The collectors are ideally situated for maximum summer time gain, with storage in a combination of liquid, gas and high density solid mass reservoirs, insulated to minimize energy loss. A properly insulated, sufficiently sized thermal reservoir is capable of storing energy during peak collection periods for release during high demand seasons.

Figure 1:
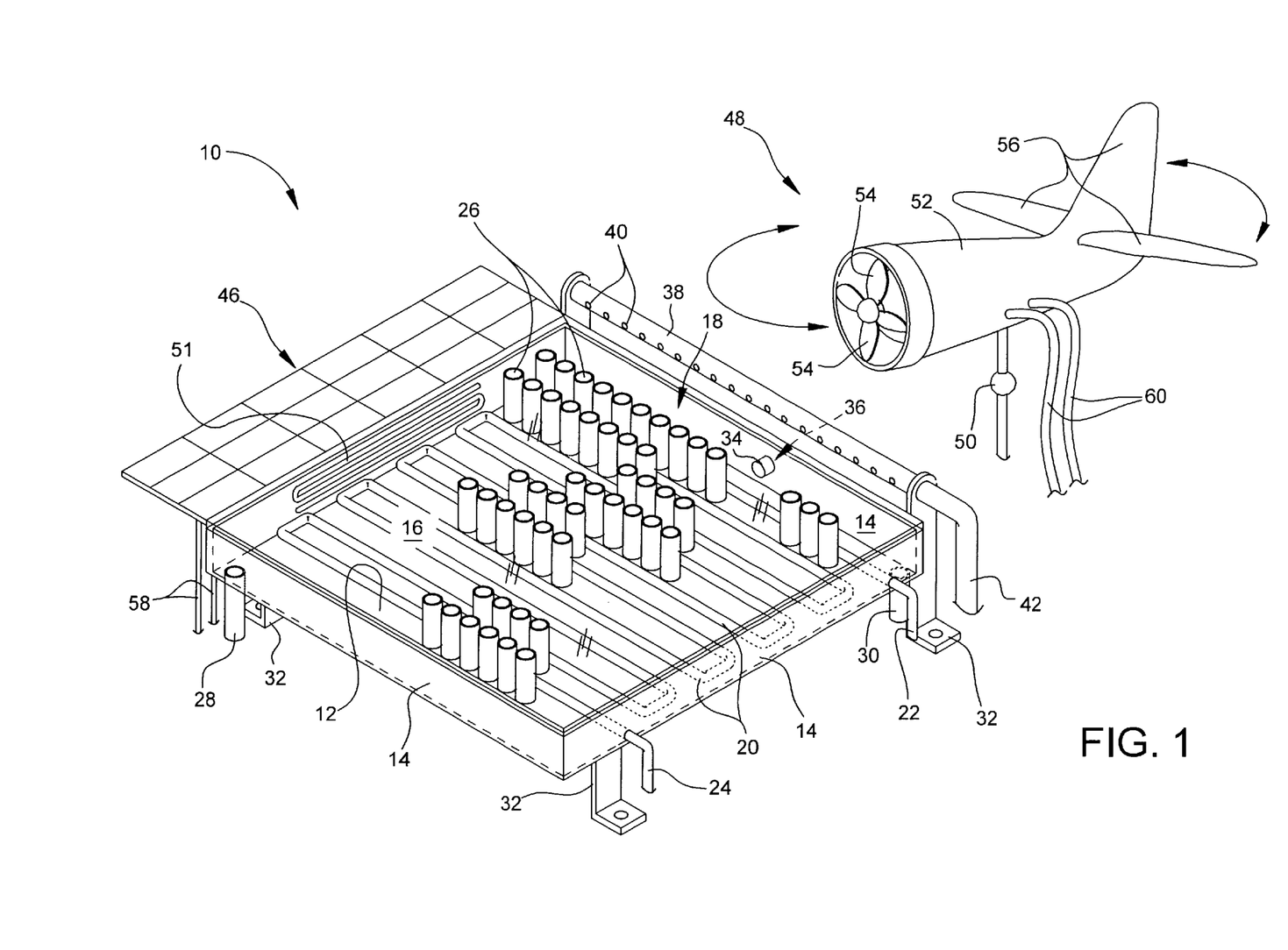
FIG. 1 is a diagrammatic, perspective view of the solar collector employed in the present invention.

FIG. 1 shows novel solar collector 10, which is the principal component of a solar heat source for serving heating and cooling needs of a building (not shown). Collector 10 has a floor 12, lateral walls 14 projecting upwardly from floor 12, and a light transmissive cover 16, defining an enclosed heating chamber 18. Floor 12 and walls 14 have non-reflective dark, preferably black, coloring within heating chamber 18, and are insulated against passage of heat from heating chamber 18 in any suitable manner as is known to those skilled in the art. Cover 16 preferably comprises two panes (not separately shown) of glass or a suitable transparent synthetic resin, with a zone of inert gas or vacuum disposed between the two panes, so that cover 16 is also insulated against heat loss from heating chamber 18. A prototype of solar collector 10 has produced temperatures within heating chamber 18 of 190 degrees Fahrenheit at ambient outside temperatures below 10 degrees Fahrenheit.

Heat is collected within heating chamber 18 by both liquid and gaseous media (not shown). An internal conduit 20 passes through heating chamber 18, conduit 20 is arranged to abut floor 12 and to lie in a winding or circuitous path, thereby exposing a considerable length of conduit 20 within heating chamber 18. A liquid (not shown) circulates through internal conduit 20, thereby gaining heat by conductive transfer from the gaseous media in heating chamber 18. Conduit 20 has an intake end 22 and a discharge end 24 for connecting conduit 20 to a liquid heat exchange circuit (see FIG. 2) utilizing heat obtained from collector 10. Liquid is introduced to conduit 20 from intake end 22 and is discharged to the building, after heating, through discharge end 24.

Collector 10 also heats air in heating chamber 18 by circulating air through the open portion of heating chamber 18. Heating chamber 18 contains a plurality of heat transfer cylinders 26 extending upwardly from floor 12 towards and terminating near cover 16. Each heat transfer cylinder 26 comprises a hollow column, preferably of a metal such as, but not limited to, aluminum, having black, non-reflective interior surfaces. Each heat transfer cylinders 26 has a height and a diameter, the height typically being greater than the diameter. The black, non-reflective surfaces of heat transfer cylinders 26 efficiently intercept light and re-radiated electromagnetic energy which could otherwise escape heating chamber 18, converting this energy into heat energy which is absorbed by the air moving through and about heat transfer cylinders 26 and heating chamber 18. While the present invention presents heat transfer cylinders 26 having continuous walls about the perimeter proximate the bottom thereof, it would be evident to one skilled in the art that the walls of heat transfer cylinders 26 could contain apertures proximate the bottom thereof to permit increased air flow therethrough.

Although heat transfer cylinders 26 as shown in FIG. 1 appear only at the upper left corner of collector 10, it should be understood that they are present along substantially the entire extent of floor 12. Likewise, although conduit 20 is depicted as extending only partially along floor 12 for clarity in FIG. 1, conduit 20, in actual practice, extends along the entire surface area of floor 12, with heat transfer cylinders 26 mounted above conduit 20. Conduit 20 and heat transfer cylinders 26 are soldered, brazed, or otherwise adhered to floor 12.

A limited amount of open space therefore exists within heating chamber 18. The two fluids, air and liquid, heated within heating chamber 18 are segregated from one another by the walls of conduit 20. Air is introduced into heating chamber 18 by an intake duct 28 and discharged from heating chamber 18, as will be explained later, by a discharge duct 30.

Solar collector 10 may be supported on a building surface (not shown) at an angle appropriate for maximally intercepting sunlight by legs 32. The angle will, of course, vary depending on the latitude of the installation. Alternatively, collector 10 may lie directly against a building surface or otherwise be supported on the building or other supporting frame. Solar collector 10 is protected against overheating by a heat relief valve 34. Heat relief valve 34 comprises a bimetallic spring (not separately shown) or other suitable thermostatic device capable of detecting a predetermined temperature within heating chamber 18, which device enables heat relief valve 34 to uncover an opening 36, enabling air to escape from heating chamber 18 to the exterior of collector 10. Conversely, electric resistance heating elements 51 may be used to prevent freezing of the system whenever it may be idle during winter months.

A spray manifold 38 having a plurality of water release openings 40 is mounted to collector 10 in a position wherein water can be discharged over cover 16 at the highest point. Manifold 38 is connected to a domestic water supply 42 so that should dirt, dust, debris, ice, snow, excess frost, or any other source of frozen water accumulate on cover 16 or photovoltaic cells 46 (to be explained later), the same can be removed or cleared from cover 16 or photovoltaic cells 46 by rinsing with domestic water. This arrangement enables collector 10 to be maintained in a condition exposed to sunlight without requiring a person to ascend the building being served to manually remove the frozen water.

Collector 10 also includes a generator 44 and an array of photovoltaic cells 46 mounted either upon collector 10 or nearby. Generator 44 is driven by a wind turbine 48 arranged by a suitable bearing 50 to rotate in the horizontal plane about three hundred sixty degrees. Turbine 48 has a shroud 52 adapted to direct wind advantageously across blades 54, and vanes 56 for orienting turbine 48 to face into the wind. Conductors 58, 60 conduct electrical power derived from generator 44 and photovoltaic cells 46 to the electrical power sub-system where generated power may be stored or immediately utilized.

Figure 2:
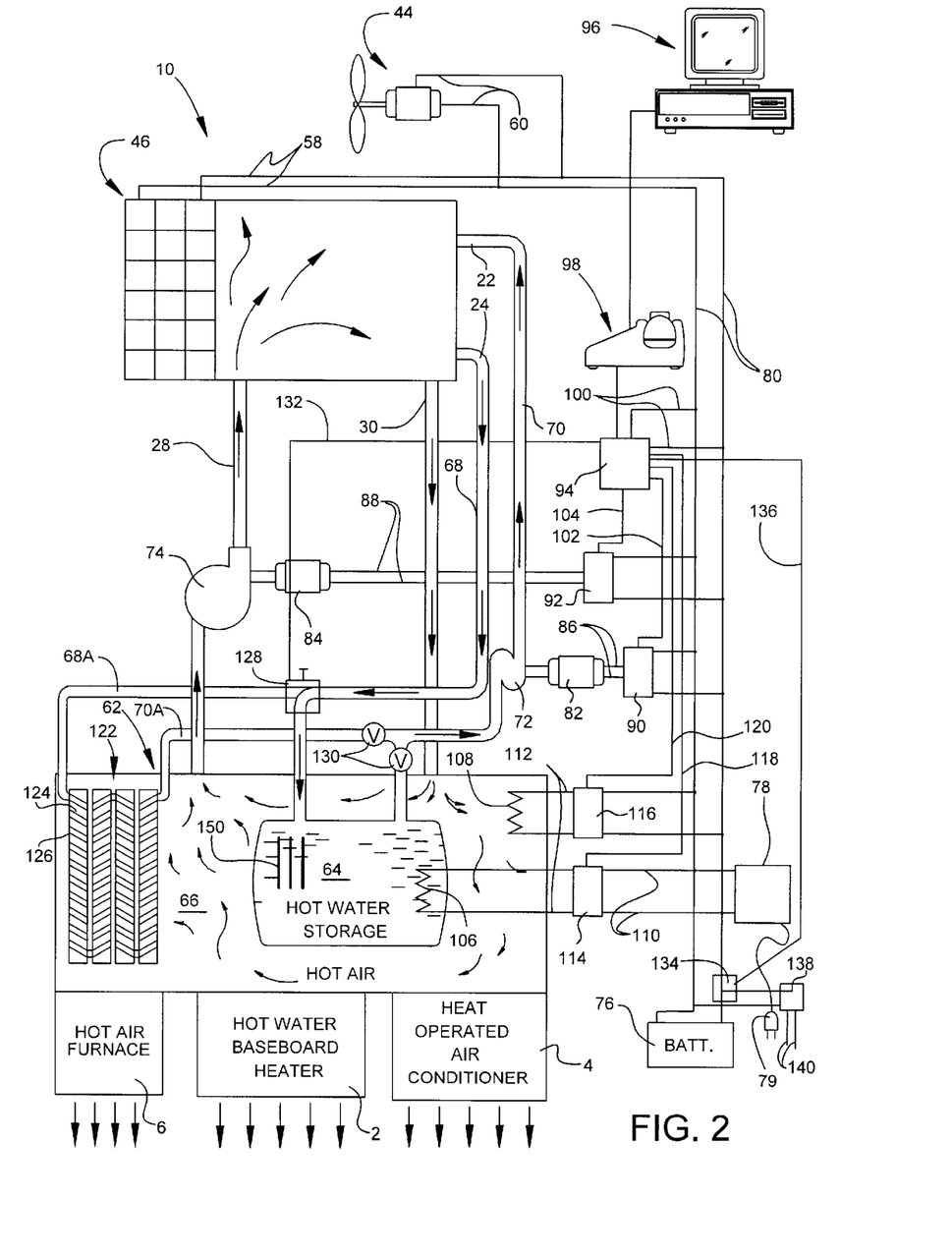
FIG. 2 is an environmental, schematic system diagram of the invention as incorporated into a building heating and cooling system, with internal details of the collector shown in FIG. 1 omitted for clarity.

The entire solar heat source utilizing collector 10 is shown schematically in FIG. 2. The heat source includes a remote thermal reservoir 62 for storing heat generated by solar collector 10. Reservoir 62 has a liquid reservoir 64 for storing a first fluid, such as water, and a gas reservoir 66 for storing a second fluid, such as air. Gas reservoir 66 preferably surrounds liquid reservoir 64 so that heat energy generated rapidly by warming air in collector 10 can be expeditiously transferred to liquid reservoir 64. Air contained in gas reservoir 66 surrounding liquid reservoir 64 also tends to serve as insulation reducing loss of heat from liquid reservoir 64. Thermal mass elements 150 are situated within liquid reservoir 64. Thermal mass elements 150, having greater density than the liquid in which they are submerged, therefore greater thermal heat capacity, increase the retentive ability of the reservoir (i.e. the number of BTUs stored per unit volume). For example, lead has a thermal heat capacity ten (10) times greater than that of water. Liquid reservoir 64 is suitably insulated to minimize heat loss from within. Liquid heated in heating chamber 18 is circulated between conduit 20, (FIG. 1) and liquid reservoir 64 by a liquid supply conduit 68 supplying liquid reservoir 64 from discharge end 24 of conduit 20, and a liquid return conduit 70 connecting liquid reservoir 64 to intake end 22 of conduit 20. A closed fluid circuit wherein liquid is heated in solar collector 10, transported to and stored in thermal reservoir 62, and returned to solar collector 10 for reheating is thus created by conduits 20, 68 and 70 and liquid reservoir 64. A pump 72 propels liquid through the closed liquid circuit on demand.

Similarly, intake duct 28 and discharge duct 30 connect gas reservoir 66 to heating chamber 18 so that a second closed fluid circuit dedicated to a gaseous medium is established between collector 10 and thermal gas reservoir 62. A fan 74 forces air through the second closed fluid circuit on demand. Thus, liquid and gas are independently passed through and heated by solar collector 10.

Also within thermal reservoir 62 is a thermal mass reservoir 122. A plurality of thermal rods 124 of a material such as, but not limited to, steel are wrapped with a heat exchanger 126 comprised of tubing of a material such as, but not limited to, copper which carry heated liquid from the closed liquid circuit including internal conduit 20 (FIG. 1). Valve 128 diverts fluid from liquid supply conduit 68 to liquid supply conduit 68A prior to liquid reservoir 64, supplying heat exchanger 126. Liquid return conduit 70A returns cooled liquid to liquid return conduit 70 for return to internal conduit 20. Check valves 130 within liquid return conduits 70 and 70A between both liquid reservoir 64 and heat exchanger 126, respectively, and the juncture of liquid return conduits 70 and 70A prevent fluid from backing up into the conduit not in current operation. Valve 128 may be used to fully divert flow from liquid reservoir 64 to heat exchanger 126 or partially divert flow so that both liquid reservoir 64 and heat exchanger 126 receive heated liquid simultaneously.

The electrical power sub-system of solar collector 10 is seen to include a storage battery 76 and a hydrocarbon powered electricity generator 78. Battery 76 is located remotely from collector 10 and is connected to conductors 58 and 60 (FIG. 1) by conductor 80 so that power generated at or near solar collector 10 may be stored for subsequent use. Generator 78 is in standby mode and automatically actuates when utility supply electricity is interrupted. Generator 78 may also be connected to a power mains by a power cord and plug 79, as shown, or by permanent hard wiring (not shown). Generator 78 provides alternative power supply should power generated at solar collector 10 be insufficient to meet electric usage demand of the system. DC power from battery 76 may be connected to respective motors 82, 84 of pump 72 and fan 74 by respective conductors 86 and 88. Battery 76 may also be charged by hydrocarbon fueled generator 78, as well as trickle charged by photovoltaic cells 46, or other ancillary power sources (not shown).

Motors 82, 84 are controlled by suitable switches 90, 92. Although switches 90, 92 and other switches employed in the novel heating and cooling system may be manual, it is preferred that system switches be automatic switches, such as relays or other electronic equipment. Relays are conveniently operated from a master controller 94. Controller 94 may be thermostatically governed, or may, as depicted, be subject to control from a personal computer 96, either locally by direct connection (not shown) or remotely through a modem (not shown but integral or associated with computer 96) and telephone line, shown symbolically at 98. Although a purely mechanical scheme could be arranged to operate controller 94, an automated scheme is preferred. Automated schemes, such as those utilizing computer 96 or any programmable controller, are more easily modified. Illustratively, pump 72 and fan 74 are more readily correlated to daily variable duration of sunlight during winter months by a programmable controller. Controller 94 is connected to system power by conductors 100 and to switches 90, 92 by control conductors 102, 104.

Power available from wind generator 44 and photovoltaic cells 46 may exceed demand arising from controls, pump 72 and fan 74. If such condition occurs during extreme demand for heat, then electrical energy may be converted into heat energy in liquid reservoir 64 by a resistive heating element 106 and in gas reservoir 66 by a resistive heating element 108. It would be obvious to one skilled in the art that a resistive heating element could also be applied to thermal mass reservoir 122, but such transfer would be much less efficient than in liquid reservoir 64 or gas reservoir 66. Resistive elements 106, 108 are connected to system power through conductors 110, 112. Switches 114, 116, both governed by controller 94 through control conductors 118, 120, control conductors 110, 112. Heat energy derived from electrical power supplements that which is available as stored energy from collector 10. Valve 128 is controlled by control conductor 132.

In addition to the solar and wind driven elements discussed to this point, the system could also include could include additional self sustaining power sources.

Figure 3:
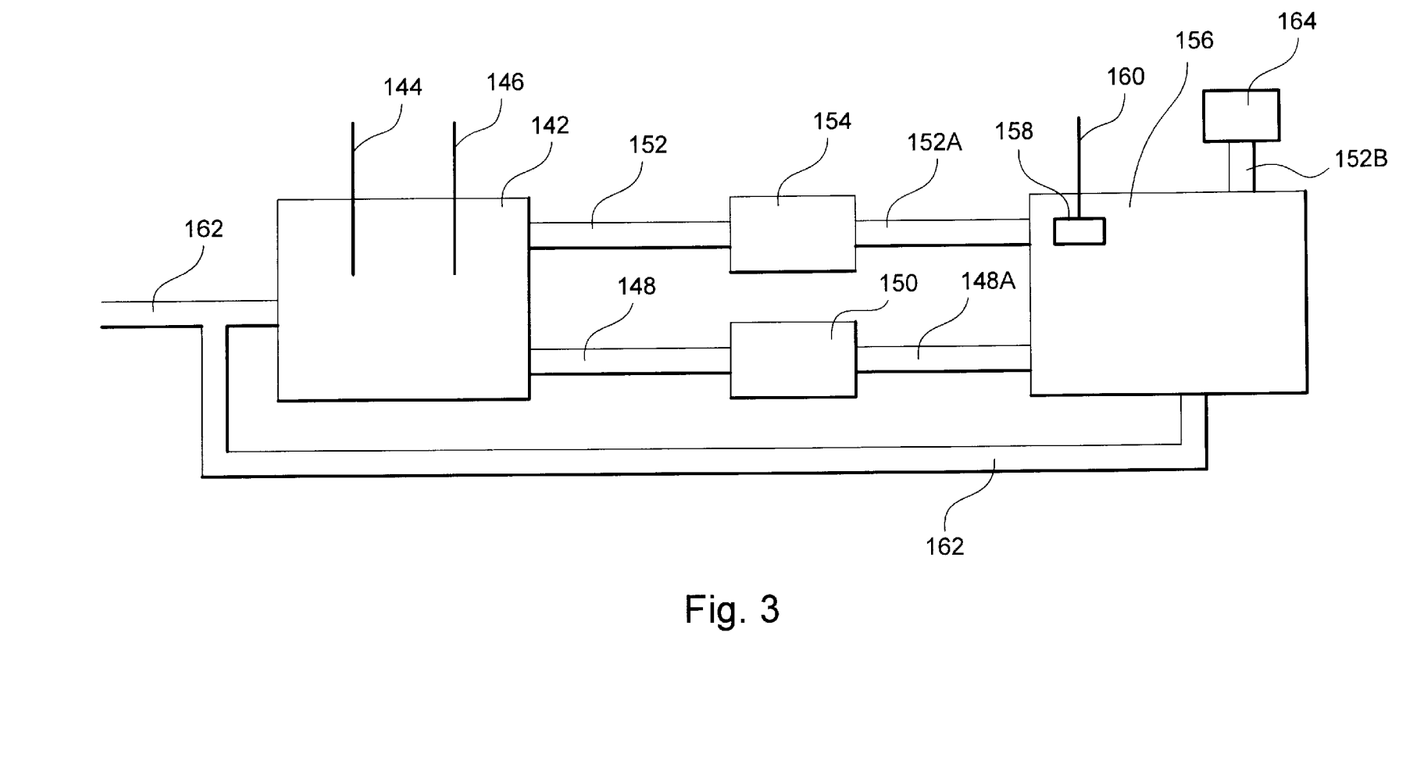
FIG. 3 is a schematic diagram of an optional electrolytic heat source incorporated as a part of the present invention.

Referring now to FIG. 3, electricity generated by the photovoltaic cells 46 or wind powered generator 44 may be used to power an electrolytic means for extracting combustible hydrogen and oxygen from water. Electrolysis chamber 142 could be located externally from thermal reservoir 62. DC power supplied from storage battery 76 by positive conductor 144 and negative conductor 146, with an appropriate DC to DC power converter for producing a suitable voltage for the electrolytic process, electrolyzes water within electrolysis chamber 142. Oxygen is conducted by oxygen conduit 148 to oxygen storage tank 150 while hydrogen is conducted by hydrogen conduit 152 to hydrogen storage tank 154. On demand, oxygen and hydrogen stored in their respective tank 150, 154 are conducted to combustion chamber 156 (preferably disposed within thermal reservoir 62) by oxygen conduit 148A and hydrogen conduit 152A. Ignition of the oxygen/hydrogen mix within combustion chamber 156 is supplied by igniter 158 supplied by conductor 160 from storage battery 76. Condensate resulting from the combustion of the oxygen/hydrogen mix may, optionally, be collected and returned to electrolysis chamber 142 by water conduit 162. Alternatively, hydrogen may be conducted to fuel cell 164 by hydrogen conduit 152B for conversion to electrical energy and incidental heat. Fuel cell 164 could be located external or external of thermal reservoir 62. It would be obvious to one skilled in the art that alternative electrolytic systems know to the art could be effectively utilized in the present invention.

Likewise, various devices and methods (not shown) known to the art for directly producing electrical and/or thermal energy from fissionable materials could be used to supply additional heat and/or electrical power.

Alternatively, if electrical energy derived from collector 10 in excess of all heating/cooling demands, excess electrical energy may be diverted by switch 134 to inverter 138 for conversion from DC to AC power and fed to the building's general electrical lines by transmission lines 140 for use in other applications. Switch 134 is controlled by control conductor 136.

Thus far, the novel solar heat source has been described. Utilization of heat and electrical power derived therefrom will now be described. During the winter heating season, heat is obtained from liquid reservoir 64 by connecting suitable conduits and pump (neither shown) thereto. Heat stored in liquid reservoir 64 may be conducted to any suitable heating equipment, such as hot water baseboard heater 2, functionally connected with the reservoir incorporating a heat exchanger within liquid reservoir 64. The conduits may be arranged in any suitable recirculation scheme. Likewise, domestic water could be heated by passing it through copper coils running through liquid reservoir 64. Of course, a forced air furnace 6 may be connected to liquid reservoir 64, gas reservoir 66 or thermal mass reservoir 122, or any combination thereof.

In the summer cooling season, heat derived from liquid reservoir 64, gas reservoir 66, or thermal mass reservoir 122, or any combination thereof, is connected to a heat operated air conditioning machine 4. Machine 4 may be a liquid absorption chiller and associated heat exchanger and air propulsion devices (not shown). Heater 2, forced air furnace 6 and machine 4 may be located in close proximity to thermal reservoir 62 or remotely, in the later case being suitably connected by conduits (not shown).

It would be evident to one skilled in the art that collectors 10 could be mounted in gangs to increase the collection area and that a plurality of thermal reservoirs 62, could be utilized to increase storage capacity. It would be further evident that any one thermal reservoir 62 need not contain each of a liquid reservoir 64, a thermal mass reservoir 122, or electrolytic combustion chamber 156, but rather, could contain a plurality of any or all.

It is to be understood that the present invention is not limited to the embodiments described above, but encompasses any and all embodiments within the scope of the following claims.

What is claimed is:

1. A solar energy collection, storage, and distribution system suitable for continuous, year round operation, comprising:
    an enclosed solar collector comprising:
        a floor,
        side walls substantially perpendicular thereto,
        a light transmissive upper surface defining a heating chamber, said heating chamber being adapted for selective orientation with respect to the sun, and
        a thermostat disposed within said heating chamber and operatively connected to means for venting said enclosed solar collector;
    a plurality of heat converting members disposed within said heating chamber;
    an intake and a discharge aperture within said walls of said heating chamber adapted to facilitate conducting a gas through said heating chamber;
    at least one internal conduit within said heating chamber adapted to conduct a liquid therethrough and having an intake and a discharge end each terminating outside said heating chamber, said internal conduit disposed to segregate said liquid therein from said gas external to said internal conduit and within said heating chamber;
    at least one remote thermal reservoir for storing heat generated by said solar collector, said at least one thermal reservoir further comprising at least one of the group:
        at least one gas reservoir operatively connected to said heating chamber, and
        at least one liquid reservoir operatively connected to said at least one internal conduit;
    whereby solar energy impinging upon said solar collector is captured therein and transferred, as thermal energy, through said at least one heat converting member and said at least one internal conduit to said at least one of said gas reservoir and said at least one liquid reservoir, such that said at least one of said reservoirs stores said thermal energy for eventual distribution therefrom.

2. A solar energy collection, storage, and distribution system, as defined in claim 1, further comprising:
an auxiliary energy source comprising at least one from the group: wind powered generator, photo-voltaic cell, fossil fuel powered generator, geothermal, direct nuclear source, hydrogen-fueled combustion source, and commercial electrical.

3. A solar energy collection, storage, and distribution system, as defined in claim 1, wherein said heat converting members comprise elongate structures disposed substantially perpendicularly to said floor and extending substantially to said light transmissive upper surface.

4. A solar energy collection, storage, and distribution system, as defined in claim 3, wherein said elongate structures comprise hollow cylinders having a diameter, an inner surface and an outer surface, at least one of said inner and said outer surfaces being energy absorbent.

5. A solar energy collection, storage, and distribution system, as defined in claim 4, wherein said elongate structures are disposed a distance less than said diameter one from another within said heating chamber.

6. A solar energy collection, storage, and distribution system, as defined in claim 1, wherein said at least one internal conduit comprise a tubular element disposed in a pattern, contained within a planar space substantially parallel to and proximate said floor of said heating chamber.

7. A solar energy collection, storage, and distribution system, as defined in claim 6, wherein at least a portion of the outer surface of said at least one internal conduit is energy absorbent.

8. A solar energy collection, storage, and distribution system, as defined in claim 1, wherein said thermostat is adapted to control said venting means at a temperature and to vent the interior of said heating chamber to an external space.

9. A solar energy collection, storage, and distribution system, as defined in claim 1, wherein said at least one liquid reservoir is disposed within at least one of said at least one gas reservoir.

10. A solar energy collection, storage, and distribution system, as defined in claim 1, wherein an operative connection between said heating chamber and said at least one gas reservoir comprises:
a gas supply conduit and
a gas return conduit, at least one of said gas conduits having
a fan disposed to force said gas through said heating chamber for heat acquisition and through said gas reservoir for heat extraction and storage.

11. A solar energy collection, storage, and distribution system, as defined in claim 1, wherein an operative connection between said internal conduit and said at least one liquid reservoir comprises;
a first liquid supply conduit and
a first liquid return conduit, at least one of said liquid conduits having
a pump disposed to force said liquid through said internal conduit for heat acquisition and through said liquid reservoir for heat storage.

12. A solar energy collection, storage, and distribution system, as defined in claim 1, wherein said solar collector includes therein heating means adapted to prevent freezing of said liquid therein.

13. A solar energy collection, storage, and distribution system, as defined in claim 12, wherein said heating means comprises an electrically powered resistance heater.

14. A solar energy collection, storage, and distribution system suitable for continuous, year round operation, comprising:
an enclosed solar collector comprising:
a floor,
side walls substantially perpendicular thereto, and
a light transmissive upper surface defining a heating chamber, said heating chamber being adapted for selective orientation with respect to the sun;
a plurality of heat converting members disposed within said heating chamber, said heat converting members further comprising:
hollow, elongate structures disposed substantially perpendicularly to said floor and extending substantially to said light transmissive upper surface, each of said elongate structures having
a diameter,
an inner surface and an outer surface, at least one of said inner and said outer surfaces being energy absorbent,
said elongate structures being disposed a distance less than said diameter one from another within said heating chamber;
an intake and a discharge aperture within said walls of said heating chamber adapted to facilitate conducting a gas through said heating chamber;
at least one internal conduit within said heating chamber adapted to conduct a liquid therethrough, said internal conduit comprising:
a tubular element disposed in a pattern substantially contained within a planar space substantially parallel to and proximate said floor of said heating chamber, and having
at least a portion of the outer surface of said at least one internal conduit which is energy absorbent,
an intake end, and
a discharge end, each terminating outside said heating chamber,
said internal conduit disposed to segregate said liquid therein from said gas external to said internal conduit and within said heating chamber;
at least one remote thermal reservoir for storing heat generated by said solar collector, said at least one thermal reservoir comprising at least one of the group:
at least one gas reservoir operatively connected to said heating chamber, said operative connection comprising:
a gas supply conduit and
a gas return conduit, at least one of said gas conduits having
a fan disposed to force said gas through said heating chamber for heat acquisition and through said gas reservoir for heat extraction and storage, and
at least one liquid reservoir operatively connected to said at least one internal conduit, said operative connection comprising:
a first liquid supply conduit and
a first liquid return conduit, at least one of said liquid conduits having
a pump disposed to force said liquid through said internal conduit for heat acquisition and through said liquid reservoir for heat storage,
said liquid reservoir disposed within said gas reservoir;
a thermostat disposed within said heating chamber and operatively connected to means for venting said enclosed solar collector, wherein said thermostat is adapted to control said venting means at a temperature and to vent the interior of said heating chamber to an external space.

15. A solar energy collection, storage, and distribution system, as defined in claim 14, further comprising:
   means for removing accumulations from said light transmissive upper surface of said solar collector.

16. A solar energy collection, storage, and distribution system, as defined in claim 15, wherein said means for removing accumulations from said light transmissive upper surface of said solar collector comprises a spray manifold for discharging water over said light transmissive upper surface so as to flush said accumulations therefrom.

17. A solar energy collection, storage, and distribution system, as defined in claim 14, wherein said fan and said pump are electrically powered.

18. A solar energy collection, storage, and distribution system, as defined in claim 14, further comprising:
   an array of photovoltaic cells disposed proximate said solar collector, said photovoltaic cells generating electrical energy.

19. A solar energy collection, storage, and distribution system, as defined in claim 14, further comprising:
   a wind turbine drivingly connected to a generator, said generator generating electrical energy.

20. A solar energy collection, storage, and distribution system, as defined in claim 14, further comprising;
   an array of photovoltaic cells disposed proximate said solar collector, and
   a wind turbine drivingly connected to a generator,
   said photovoltaic cells and generator generating electrical energy.

21. A solar energy collection, storage, and distribution system, as defined in claim 20, further comprising:
   a storage battery operatively connected to said photovoltaic cells and said generator for storage of electrical energy.

22. A solar energy collection, storage, and distribution system, as defined in claim 21, further comprising at least one of:
   a first resistive heating element disposed within said gas reservoir, and electrically connected to said battery, and
   a second resistive heating element disposed within said liquid reservoir, and electrically connected to said battery,
   whereby electrical energy generated by said photovoltaic cells and said generator may supplement heat collected by said solar collector.

23. A solar energy collection, storage, and distribution system suitable for continuous, year round operation, comprising:
   an enclosed solar collector comprising:
      a floor,
      side walls perpendicular thereto, and
      a light transmissive upper surface defining an enclosed heating chamber, said heating chamber being adapted for selective orientation with respect to the sun;
   a plurality of heat converting members disposed within said heating chamber, each of said heat converting members comprising:
      a hollow, elongate structure disposed substantially perpendicularly to said floor and extending substantially to said light transmissive upper surface, each of said elongate structures having
         a diameter,
         an inner surface and an outer surface, at least one of said inner and said outer surfaces being energy absorbent,
      said elongate structures being disposed a distance less than said diameter one from another within said heating chamber;
   an intake and a discharge aperture within said walls of said heating chamber adapted to facilitate conducting a gas through said heating chamber;
   at least one internal conduit within said heating chamber adapted to conduct a liquid therethrough, said internal conduit comprising:
      a tubular element disposed in a pattern substantially contained within a planar space substantially parallel to and proximate said floor of said heating chamber, and having
         at least a portion of the outer surface of said at least one of said internal conduits which is energy absorbent,
         an intake end, and
         a discharge end, each terminating outside said heating chamber,
      said internal conduit adapted to segregate said liquid therein from said gas external to said internal conduit and within said heating chamber;
   at least one remote thermal reservoir for storing heat generated by said solar collector, said at least one thermal reservoir further comprising at least one of the group:
      at least one gas reservoir operatively connected to said heating chamber, said operative connection comprising:
         a gas supply conduit and
         a gas return conduit, at least one of said gas supply and return conduits having:
            a fan adapted to force said gas through said heating chamber for heat acquisition and through said gas reservoir for heat extraction and storage, and
      at least one liquid reservoir operatively connected to said at least one internal conduit, said operative connection comprising:
         a first liquid supply conduit and
         a first liquid return conduit, at least one of said liquid conduits having
            a pump disposed to force said liquid through said internal conduit for heat acquisition and through said liquid reservoir for heat storage,
      said liquid reservoir disposed within said gas reservoir;
   a thermostat disposed within said heating chamber and operatively connected to means for venting said enclosed solar collector, wherein said thermostat is adapted to control said venting means at a temperature and to vent the interior of said heating chamber to an external space;
   a spray manifold for discharging water over said light transmissive upper surface for cleaning the surface thereof;
   an array of photovoltaic cells disposed proximate said solar collector, and
   a wind turbine drivingly connected to a generator,
   said photovoltaic cells and generator generating electrical energy;
   a storage battery operatively connected to said photovoltaic cells and said generator for storage of electrical energy;

at least one of:
- a first resistive heating element disposed within said gas reservoir, and electrically connected to said battery, and
- a second resistive heating element disposed within said liquid reservoir, and electrically connected to said battery, whereby electrical energy generated by said photovoltaic cells and said generator may supplement heat collected by said solar collector.

24. A solar energy collection, storage, and distribution system, as defined in claim 23, further comprising:
    means for controlling at least one of said fan, pump, first resistive heating element, and second resistive heating element.

25. A solar energy collection, storage, and distribution system, as defined in claim 23, further comprising:
    a fossil fuel powered generator, selectively operated, on demand, supplementing electrical energy generated by said photovoltaic cells and said wind turbine powered generator.

26. A solar energy collection, storage, and distribution system, as defined in claim 23, further comprising:
    a DC to AC power inverter operatively connected to said photovoltaic cells and said wind turbine powered generator.

27. A solar energy collection, storage, and distribution system, as defined in claim 26, further comprising:
    means for selectively controlling electrical energy generated by said photovoltaic cells and said wind turbine powered generator from said solar energy collection, storage, and distribution system to commercial electrical mains for supplying electrical energy thereto.

28. A solar energy collection, storage, and distribution system suitable for continuous, year round operation, comprising:
    an enclosed solar collector further comprising:
        a floor,
        side walls perpendicular thereto, and
        a light transmissive upper surface defining an enclosed heating chamber said heating chamber being adapted for selective orientation with respect to the sun;
    a plurality of heat converting members disposed within said heating chamber, said heat converting members comprising:
        hollow, elongate structures disposed substantially perpendicularly to said floor and extending substantially to said light transmissive upper surface, each of said elongate structures having
            a diameter,
            an inner surface and an outer surface, at least one of said inner and said outer surfaces being energy absorbent,
        said elongate structures being disposed a distance less than said diameter one from another within said heating chamber;
    an intake and a discharge aperture within said walls of said heating chamber adapted to allow introduction of a gas into and allow said gas to flow through said heating chamber;
    at least one internal conduit within said heating chamber adapted to conduct a liquid therethrough, said internal conduit comprising:
        a tubular element disposed in a pattern substantially contained within a planer space substantially parallel to and proximate said floor of said heating chamber, and having
            at least a portion of the outer surface of said at least one internal conduit which is substantially energy absorbent,
            an intake end, and
            a discharge end, each terminating outside said heating chamber,
        said internal conduit disposed to segregate said liquid therein from said gas external to said internal conduit and within said heating chamber;
    at least one remote thermal reservoir for storing heat generated by said solar collector, said at least one thermal reservoir further comprising at least one of the group:
        at least one gas reservoir operatively connected to said heating chamber, said operative connection comprising:
            a gas supply conduit and
            a gas return conduit, at least one of said gas conduits having
                a fan adapted to force said gas through said heating chamber for heat acquisition and through said gas reservoir for heat storage, and
        at least one liquid reservoir operatively connected to said at least one internal conduit, said operative connection comprising:
            a first liquid supply conduit and
            a first liquid return conduit, at least one of said liquid conduits having
                a pump adapted to force said liquid through said internal conduit for heat acquisition and through said liquid reservoir for heat storage,
        said liquid reservoir being disposed within said gas reservoir;
    a thermostat disposed within said heating chamber and operatively connected to means for venting said enclosed solar collector, wherein said thermostat is adapted to control said venting means at a temperature and to vent the interior of said heating chamber to an external space;
    a spray manifold for discharging water over said light transmissive upper surface for removing accumulations from said light transmissive upper surface of said solar collector;
    an array of photovoltaic cells disposed proximate said solar collector, and
    a wind turbine drivingly connected to a generator,
    said photovoltaic cells and generator generating electrical energy;
    a storage battery operatively connected to said photovoltaic cells and said generator for storage of electrical energy;
    a fossil fuel powered generator, selectively operated, on demand, supplementing electrical energy generated by said photovoltaic cells and said wind turbine powered generator;
    a DC to AC power inverter;
    a first resistive heating element disposed within said gas reservoir, and electrically connected to said battery, and
    a second resistive heating element disposed within said liquid reservoir, and electrically connected to said battery,
    whereby electrical energy generated by said photovoltaic cells and said generator may supplement heat collected by said solar collectors;
    means for controlling at least one of said fan, pump, first resistive heating element, and second resistive heating element; and means for selectively directing electrical energy generated by at least one of said photovoltaic cells and said wind turbine powered generator from said solar energy collection, storage, and distribution system to commercial electrical mains.

29. A solar energy collection, storage, and distribution system, as defined in claim 28, further comprising:
a substantially solid thermal mass element disposed within said liquid reservoir.

30. A solar energy collection, storage, and distribution system, as defined in claim 28, further comprising:
a thermal mass reservoir disposed within said at least one thermal reservoir, said thermal mass reservoir operatively connected to said first liquid supply conduit and said first liquid return conduit.

31. A solar energy collection, storage, and distribution system, as defined in claim 30, wherein said operational connectivity comprises:
a second liquid supply conduit in fluid communication with said first liquid supply conduit,
a second liquid return conduit in fluid communication with said first liquid return conduit,
means for at least partially selectively directing the flow of said liquid from said first liquid supply conduit to said second liquid supply conduit and from said second liquid supply conduit to said first liquid supply conduit, and
means for preventing backflow of said liquid from said first liquid return conduit to said second liquid return conduit and from said second liquid return conduit to said first liquid return conduit.

32. A solar energy collection, storage, and distribution system, as defined in claim 31, wherein
said means for at least partially selectively directing the flow of said liquid from said first liquid supply conduit to said second liquid supply conduit comprises a valve, and
said means for preventing backflow of said liquid from said first liquid return conduit to said second liquid return conduit and from said second liquid return conduit to said first liquid return conduit comprises a check valve disposed in each of said first and second liquid return conduits between a juncture of said first and second liquid return conduit and said liquid reservoir and said thermal mass reservoir, respectively.

33. A solar energy collection, storage, and distribution system, as defined in claim 31, wherein
said means for at least partially selectively directing the flow of said liquid from said first liquid supply conduit to said second liquid supply conduit comprises a liquid supply valve, and
said means for preventing backflow of said liquid from said first liquid return conduit to said second liquid return conduit and from said second liquid return conduit to said first liquid return conduit comprises a liquid return valve working cooperatively with said liquid supply valve,
said liquid supply valve and said liquid return valve disposed to limit the flow of said liquid in at least one of said liquid reservoir and said thermal mass reservoir.

34. A solar energy collection, storage, and distribution system suitable for continuous, year round operation, comprising:
an enclosed solar collector further comprising:
a floor,
side walls perpendicular thereto, and
a light transmissive upper surface defining a heating chamber, said heating chamber being adapted for selective orientation with respect to the sun;
a plurality of heat converting members disposed within said heating chamber, said heat converting members further comprising:
hollow, elongate structures disposed substantially perpendicularly to said floor and extending substantially to said light transmissive upper surface, each of said elongate structures having
a diameter,
an inner surface and an outer surface, at least one of said inner and said outer surfaces being energy absorbent,
said elongate structures being disposed a distance less than said diameter one from another within said heating chamber;
an intake and a discharge aperture within said walls of said heating chamber adapted to conduct a gas through said heating chamber;
at least one internal conduit within said heating chamber adapted to conduct a liquid therethrough, said internal conduit comprising:
a tubular element disposed in a pattern substantially contained within a planar space substantially parallel to and proximate said floor of said heating chamber, and having
at least a portion of the outer surface of said at least one internal conduit which is energy absorbent,
an intake end, and
a discharge end, each terminating outside said heating chamber,
said internal conduit disposed to segregate said liquid therein from said gas external to said internal conduit and within said heating chamber;
at least one remote thermal reservoir for storing heat generated by said solar collector, said at least one thermal reservoir further comprising at least one of the group:
at least one gas reservoir operatively connected to said heating chamber, said operative connection comprising:
a gas supply conduit and
a gas return conduit, at least one of said gas conduits having
a fan adapted to force said gas through said heating chamber for heat acquisition and through said gas reservoir for heat storage, and
at least one from the group of
at least one liquid reservoir, having disposed therein a substantially solid thermal mass element, operatively connected to said at least one internal conduit, said operative connection comprising:
a first liquid supply conduit and
a first liquid return conduit, at least one of said liquid conduits having
a pump adapted to force said liquid through said internal conduit for heat acquisition and through said liquid reservoir for heat storage, and
a thermal mass reservoir operatively connected to said at least one internal conduit, said operative connection comprising:
a second liquid supply conduit in fluid communication with said first liquid supply conduit, a second liquid return conduit in fluid communication with said first liquid return conduit, a liquid supply valve controlling said fluid communication between said first liquid supply conduit and said second liquid supply conduit, and a check valve disposed in each of said first and second liquid return conduits between a juncture of said first and second liquid return conduit and said liquid reservoir and said thermal mass reservoir, respectively, said check valve disposed in each of said first and second liquid return conduits preventing backflow of said fluid from said first liquid return conduit to said second liquid conduit and from said second liquid return conduit to said first liquid return conduit, said liquid reservoir and thermal mass reservoir disposed within said gas reservoir;

a thermostat disposed within said heating chamber and operatively connected to means for venting said enclosed solar collector, wherein said thermostat is adapted to control said venting means at a temperature and to vent the interior of said heating chamber to an external space;

a spray manifold for discharging water over said light transmissive upper surface for removing accumulations from said light transmissive upper surface of said solar collector;

an array of photovoltaic cells disposed proximate said solar collector, and a wind turbine drivingly connected to a generator, said photovoltaic cells and generator generating electrical energy;

a storage battery operatively connected to said photovoltaic cells and said generator for storage of electrical energy;

a fossil fuel powered generator, selectively operated, on demand, supplementing electrical energy generated by said photovoltaic cells and said wind turbine powered generator;

a DC to AC power inverter;

a first resistive heating element disposed within said gas reservoir, and electrically connected to said battery, and a second resistive heating element disposed within said liquid reservoir, and electrically connected to said battery, whereby electrical energy generated by said photovoltaic cells and said generator may supplement heat collected by said solar collectors;

means for controlling at least one of said fan, pump, first resistive heating element, and second resistive heating element; and means for selectively switching electrical energy generated by said photovoltaic cells and said wind turbine powered generator from said solar energy collection, storage, and distribution system to commercial electrical mains.

35. A solar energy collection, storage, and distribution system, as defined in claim 34, further comprising:

electrolysis means adapted to extract hydrogen and oxygen from water.

36. A solar energy collection, storage, and distribution system, as defined in claim 35, wherein said electrolysis means comprises:

an anode and a cathode, each being operatively connected to said storage battery.

37. A solar energy collection, storage, and distribution system, as defined in claim 35, further comprising means for storing at least one of said oxygen and said hydrogen.

38. A solar energy collection, storage, and distribution system, as defined in claim 37, further comprising:

combustion means operatively connected to said storage means for extracting heat from said oxygen and said hydrogen.

39. A solar energy collection, storage, and distribution system, as defined in claim 37, further comprising:

a fuel cell operatively connected to said hydrogen storage means for generating electrical energy therefrom.

40. A solar energy collection, storage, and distribution system, as defined in claim 35, further comprising:

nuclear fission means of generating heat and electrical energy.

41. A solar energy collection, storage, and distribution system, as defined in claim 34, for serving a building and further comprising:

a forced air heating system disposed in heat exchange relationship with said at least one thermal reservoir and the building being served by said solar energy collection, storage, and distribution system.

42. A solar energy collection, storage, and distribution system, as defined in claim 34, for serving a building and further comprising:

a hot water/steam heating system disposed in heat exchange relationship with said at least one thermal reservoir and the building being served by said solar energy collection, storage, and distribution system.

43. A solar energy collection, storage, and distribution system, as defined in claim 34, for serving a building and further comprising:

a heat operated air conditioning machine disposed in heat exchange relationship with said at least one thermal reservoir such that collected heat generates refrigeration for distribution to the building being served by said solar energy collection, storage, and distribution system.

* * * * *